(12) United States Patent
Liu

(10) Patent No.: US 9,376,221 B1
(45) Date of Patent: Jun. 28, 2016

(54) METHODS AND APPARATUS TO POINT A PAYLOAD AT A TARGET

(71) Applicant: The Boeing Company, Chicago, IL (US)

(72) Inventor: Yong Liu, San Marino, CA (US)

(73) Assignee: THE BOEING COMPANY, Chicago, IL (US)

( * ) Notice: Subject to any disclaimer, the term of this patent is extended or adjusted under 35 U.S.C. 154(b) by 53 days.

(21) Appl. No.: 13/665,857

(22) Filed: Oct. 31, 2012

(51) Int. Cl.
  *B64G 1/36* (2006.01)
  *B64G 1/22* (2006.01)
  *H01Q 3/08* (2006.01)

(52) U.S. Cl.
  CPC .. *B64G 1/36* (2013.01); *B64G 1/22* (2013.01); *H01Q 3/08* (2013.01)

(58) Field of Classification Search
  CPC ............... H01Q 3/08; B64G 1/22; B64G 1/36
  USPC ................................ 244/172.6; 342/354, 359
  See application file for complete search history.

(56) References Cited

U.S. PATENT DOCUMENTS

| | | | | |
|---|---|---|---|---|
| 2,594,317 A | * | 4/1952 | Lancor, Jr. ................. | G01S 3/42 342/67 |
| 3,215,391 A | * | 11/1965 | Storm ................... | B25J 17/0266 108/4 |
| 3,757,336 A | * | 9/1973 | Rosen ........................... | 342/354 |
| 4,118,705 A | * | 10/1978 | Varley ........................ | G01S 3/44 318/616 |
| 4,691,207 A | * | 9/1987 | Timineri ....................... | 343/766 |
| 4,823,134 A | * | 4/1989 | James et al. ................... | 342/359 |
| 5,043,737 A | * | 8/1991 | Dell-Imagine ................ | 342/358 |
| 5,131,611 A | * | 7/1992 | Vollaro ................... | B64G 1/645 244/173.1 |
| 5,184,139 A | * | 2/1993 | Hirako et al. ................. | 342/354 |
| 5,261,631 A | * | 11/1993 | Bender .................. | B64G 1/285 244/165 |
| 5,579,018 A | * | 11/1996 | Francis et al. ................ | 343/757 |
| 5,852,423 A | * | 12/1998 | Hughes .................. | H01Q 1/125 343/765 |
| 5,912,642 A | * | 6/1999 | Coffin et al. .................... | 342/359 |
| 5,999,139 A | * | 12/1999 | Benjamin ............ | H01Q 1/1257 343/757 |
| 6,025,815 A | * | 2/2000 | Supper ..................... | B64G 1/22 343/878 |
| 6,188,502 B1 | * | 2/2001 | Aoki ...................... | G02B 27/20 359/198.1 |

(Continued)

FOREIGN PATENT DOCUMENTS

DE  WO 2010149140  * 12/2010  ............... H01Q 1/18

OTHER PUBLICATIONS

WO 2010149140 Specification (english machine translation).*

(Continued)

*Primary Examiner* — Tien Dinh
*Assistant Examiner* — Alexander V Giczy
(74) *Attorney, Agent, or Firm* — Hanley, Flight and Zimmerman, LLC

(57) ABSTRACT

Methods and Apparatus to point a payload at a target are disclosed herein. An example method includes estimating a first orientation of a base of a payload to point the payload at a target. The base is coupled to a satellite via a pivot joint and a linear actuator. The linear actuator is to enable adjustment of an azimuth angle and an elevation angle of the base. The example method further includes communicating a command to actuate the actuator to move the base to the first orientation and determining a base orientation error. The base orientation error is a difference between the first orientation and a second orientation of the base to which the actuator moves the base in response to the command. The example method also includes determining a stroke position error of the actuator based on the base orientation error.

13 Claims, 10 Drawing Sheets

(56) References Cited

U.S. PATENT DOCUMENTS

| | | | |
|---|---|---|---|
| 6,317,093 B1* | 11/2001 | Harris | 343/765 |
| 6,330,988 B1 | 12/2001 | Liu et al. | |
| 6,504,502 B1* | 1/2003 | Wu | B64G 1/24 342/354 |
| 6,679,455 B2* | 1/2004 | Chatenet | F16M 11/125 244/158.1 |
| 6,720,918 B2* | 4/2004 | Reckdahl et al. | 342/358 |
| 6,771,217 B1* | 8/2004 | Liu et al. | 342/368 |
| 6,825,806 B2* | 11/2004 | Liu et al. | 342/359 |
| 7,081,866 B2* | 7/2006 | Gaechter | H01Q 1/125 343/832 |
| 7,134,630 B2* | 11/2006 | Plotke et al. | 244/171 |
| 7,221,317 B2* | 5/2007 | Tekawy et al. | 342/358 |
| 7,258,306 B2* | 8/2007 | Plotke et al. | 244/171 |
| 7,414,576 B1* | 8/2008 | Liu | 342/359 |
| 7,561,968 B2* | 7/2009 | Liu et al. | 701/513 |
| 7,663,542 B1* | 2/2010 | Goodzeit et al. | 342/359 |
| 7,724,188 B2* | 5/2010 | Liu | 342/359 |
| 7,898,476 B2* | 3/2011 | Nichols | H01Q 1/125 342/359 |
| 8,046,203 B2* | 10/2011 | Blevins | F41G 3/32 703/6 |
| 8,723,724 B2* | 5/2014 | Mendelsohn | H04B 7/18513 342/354 |
| 2006/0065788 A1* | 3/2006 | Tsao et al. | 244/171 |
| 2007/0027590 A1* | 2/2007 | Liu et al. | 701/13 |
| 2008/0279685 A1* | 11/2008 | Kessler et al. | 416/31 |
| 2009/0299494 A1* | 12/2009 | Kahn | G05B 13/04 700/28 |
| 2010/0084517 A1* | 4/2010 | Benson | B64C 27/605 244/228 |
| 2012/0119973 A1* | 5/2012 | Ahring | F41H 5/26 343/882 |

OTHER PUBLICATIONS

Mogens Lauritzen, "Linear Actuators in Solar Tracking Systems," Jun. 2009. Accessed from http://www.lauritzen.biz/static/solutions/linear_actuators.pdf on Mar. 18, 2015.*

Ovid W. Eshbach and Mott Souders, ed. "Handbook of Engineering Fundamentals", Third Edition. New York: John Wiley & Sons. 1975.*

Olivier L. de Weck, "Attitude Determination and Control (ADCS)" in 16.684 Space Systems Product Development, Spring 2001. Dept of Aeronautics & Astronautics, Massachusetts Institute of Technolnology. Accessed http://ocw.mit.edu/courses/aeronautics-and-astronautics/16-851-satellite-engineering-fall-2003/lecture-notes/19_acs.pdf on Sep. 19, 2014.*

* cited by examiner

METHODS AND APPARATUS TO POINT A PAYLOAD AT A TARGET

FIELD

The present disclosure relates generally to payloads and, more particularly, to methods and apparatus to point a payload at a target.

BACKGROUND

Generally, a payload is to be substantially pointed at a target. For example, an antenna is to be substantially pointed at a target to enable communication between the antenna and the target. If the antenna points away from the target, the communication between the antenna and the target is affected. The antenna may be disposed on a satellite in orbit around Earth. Due to the distance between the satellite and a target on Earth, an alignment error of the antenna influenced by thermal distortion, machining tolerances, etc. may cause the antenna to point away from the target.

SUMMARY

An example method includes estimating a target orientation of a base of a payload to point the payload at a target. The base is coupled to a satellite via a pivot joint and a linear actuator. The linear actuator is to enable adjustment of an azimuth angle and an elevation angle of the base. The example method further includes communicating a command to actuate the actuator to move the base to the target orientation and determining a base orientation error. The base orientation error is a difference between the target orientation and a resultant orientation of the base in response to the command to actuate the first and second actuators to move the base to the target orientation.

An example tangible machine readable storage medium disclosed herein includes instructions that, when executed, cause a machine to at least communicate a command to actuate a linear actuator operatively coupled to a base of a payload to orient the base at a first azimuth angle and a first elevation angle to point the payload at a target. The base is pivotably coupled to a satellite via a joint. The instructions further cause the machine to determine a pointing error based on an experimentally determined second azimuth angle and an experimentally determined second elevation angle of the base to point the payload at the target. Also, the instructions cause the machine to determine a stroke position error of the linear actuator based on the pointing error.

An example apparatus disclosed herein includes a base rotatably coupled to a satellite via a pivot joint. A payload is coupled to the base. The example apparatus further includes a linear actuator operatively coupled to the satellite and the base to enable adjustment of an azimuth angle and an elevation angle of the base. The example apparatus also includes a controller in communication with the linear actuator. The controller is to determine a stroke position error of the linear actuator and, based on the stroke position error, the controller is to control the linear actuator to control a pointing direction of the payload.

Figure 1:
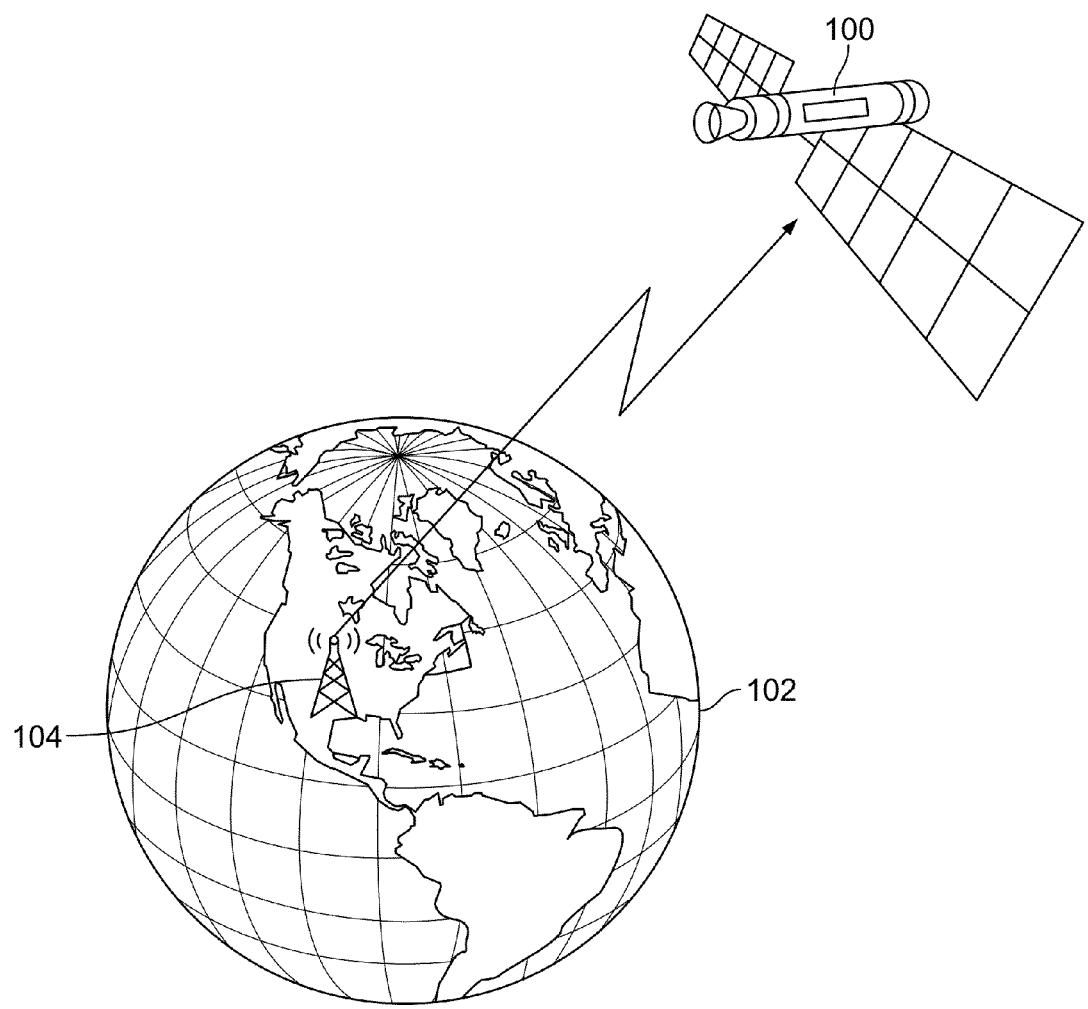
FIG. 1 illustrates an example satellite in communication with a target in accordance with the teachings of this disclosure.

Wherever possible, the same reference numbers will be used throughout the drawing(s) and accompanying written description to refer to the same or like parts. As used in this disclosure, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DESCRIPTION

Methods and apparatus to point a payload at a target are disclosed herein. An example apparatus disclosed herein includes a payload such as, for example, an antenna, a transmitter, a sensor (e.g., an infrared sensor), an optical device, a camera, and/or any other suitable payload coupled to a base that is rotatable about a joint. In some examples, the base is operatively coupled to a first actuator (e.g., a linear actuator such as, for example, a jackscrew) and a second actuator (e.g., a linear actuator such as, for example, a jackscrew). The first actuator and the second actuator may enable rotation of the base about the joint to adjust an azimuth angle and/or an elevation angle of the base. A controller may be in communication with the first actuator and the second actuator to control a first stroke position of the first actuator and a second stroke position of the second actuator.

To point the payload at a target, the controller may determine and compensate for a first stroke position error corresponding to the first actuator and a second stroke position error corresponding to the second actuator. The first stroke position error and/or the second stroke position error may be influenced by thermal distortion, machining tolerances, alignment errors, etc. In some examples, the first stroke position error and the second stroke position error are constant relative to an orientation of the base and/or an amount of rotation of the base. As such, the base may be rotated over a wide distance range (e.g., ten degrees of rotation or more) via the first actuator and the second actuator to point the payload at the target.

FIG. 1 illustrates an example satellite 100 in accordance with the teachings of this disclosure. In the illustrated example, the satellite 100 is in orbit around Earth 102. However, in other examples, the satellite 100 may be in orbit around another celestial body such as, for example, Earth's moon. In the illustrated example, the satellite 100 is in communication with a ground station 104 located on Earth 102. In some examples, the satellite 100 is in communication with one or more other ground stations, satellites, and/or other targets. As described in greater detail below, the example satellite 100 includes a payload (FIG. 2), which may be employed to communicate information to the ground station 104, receive signals, generate images, etc.

Figure 2:
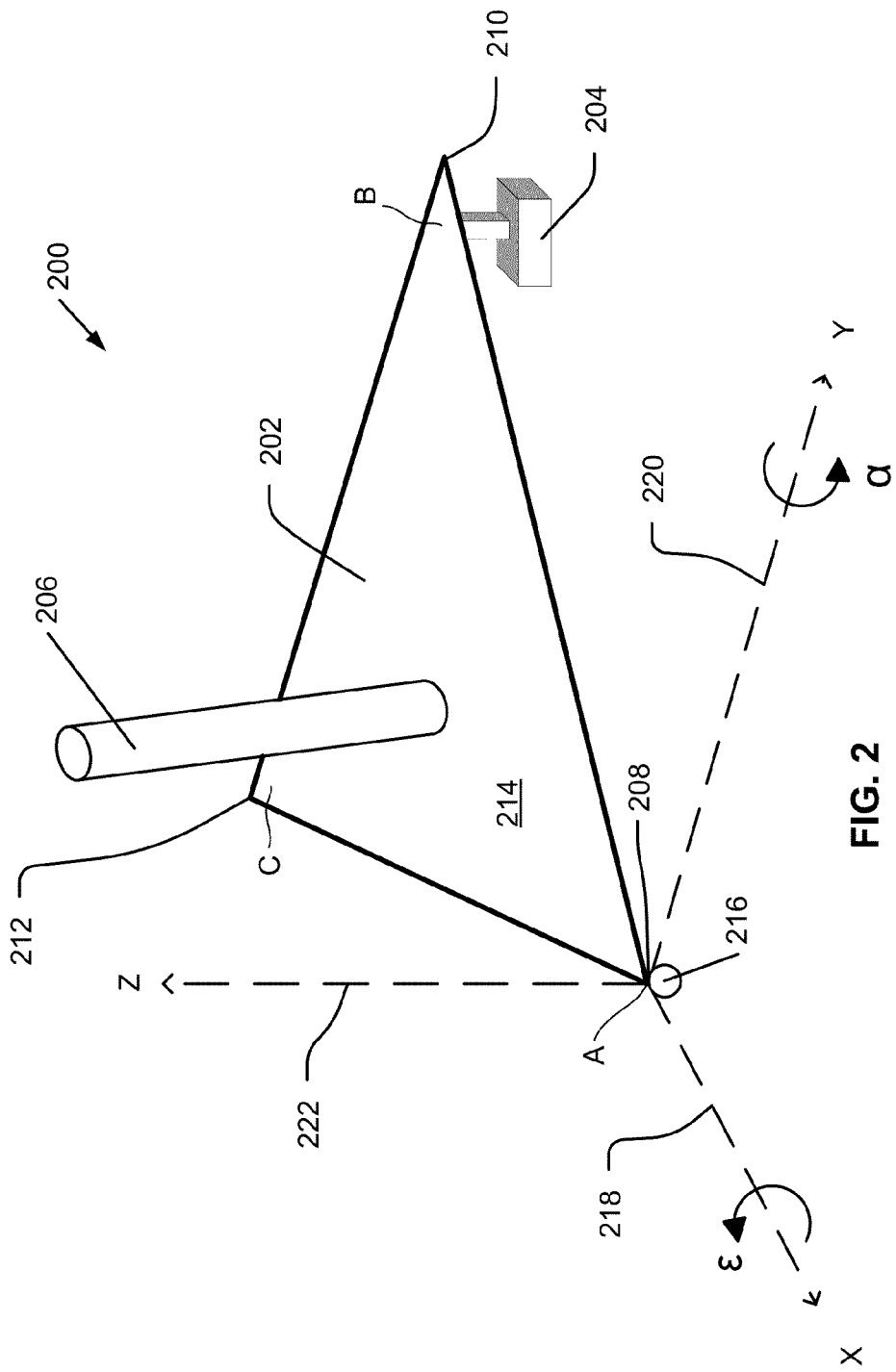
FIG. 2 is a perspective view of an example payload assembly disclosed herein.

FIG. 2 is a perspective view of an example payload assembly 200 disclosed herein, which may be used to communicate information from the example satellite 100 of FIG. 1 to a target (e.g., the ground station 104), receive signals (e.g., optical signals) from the target, generate images of the target, etc. In the illustrated example, the payload assembly 200 includes a base 202, a first actuator 204, a second actuator 300 (FIG. 3), and a payload 206 such as, for example, an antenna, a sensor (e.g., an infrared sensor), a camera, an optical device, etc. In the illustrated example, the base 202 is a triangular plate. Thus, the base 202 includes a first corner 208, a second corner 210 and a third corner 212. The base 202 defines a substantially planar surface 214 onto which the payload 206 is coupled. In the illustrated example, the planar surface 214 is to substantially face the ground station 104 during operation of the example satellite 100. In other examples, the base 202 is other shapes (e.g., rectangular, circular, a shape that defines a rounded or uneven (e.g., stepped) surface facing the ground station 104, etc.). In the illustrated example, the payload 206 is disposed on the base 202 substantially normal to the planar surface 214 (i.e., the payload 206 is substantially perpendicular to the base 202).

In the illustrated example, the base 202 is rotatably coupled to the satellite 100 via a pivot joint 216 (e.g., a ball joint) disposed at or adjacent the first corner 208. The example joint 216 enables the base 202 to rotate at point A about a first axis (X-axis) 218 and a second axis (Y-axis) 220. The example first axis 218 and the example second axis 220 intersect at point A. In the illustrated example, a third axis (Z-axis) 222 intersects the first axis 218 and the second axis 220 at point A. Thus, point A corresponds to coordinates (0, 0, 0). The above-noted axes 218, 220 and 222 are merely examples and, thus, other axes may be employed in other examples. In the illustrated example, an elevation angle, $\epsilon$, of the base 202 is an amount of rotation of the base 202 from coordinates (0, 0, 0) about the first axis 218. An azimuth angle, $\alpha$, of the example base 202 is an amount of rotation of the base 202 from coordinates (0, 0, 0) about the second axis 220. Thus, a position or orientation of the example base 202 may be defined by the azimuth angle and the elevation angle of the base 202.

Figure 3:
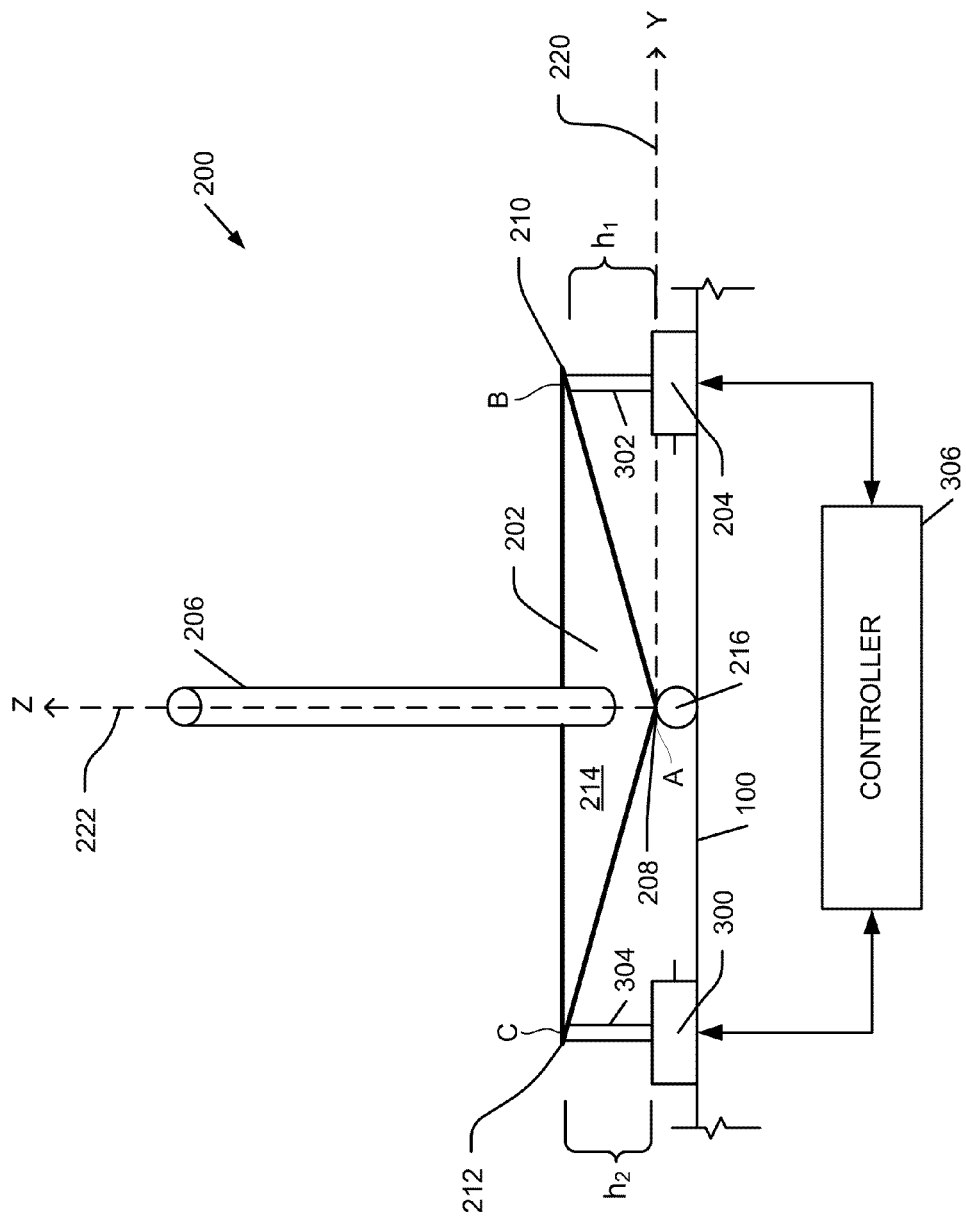
FIG. 3 is a rear view of the example payload assembly of FIG. 2.

FIG. 3 is a rear view of the example payload assembly 200 of FIG. 2. In the illustrated example, the base 202 is operatively coupled to the satellite 100 via the first actuator 204 and a second actuator 300, respectively. The example first actuator 204 is coupled to the base 202 at point B, which is adjacent the second corner 210 of the base 202. The example second actuator 300 is coupled to the base 202 at point C, which is adjacent the third corner 212 of the base 202. In the illustrated example, the first actuator 204 and the second actuator 300 are jackscrews. However, the first actuator 204 and the second actuator 300 may be implemented using any type of linear actuator. In the illustrated example, strokes of the first actuator 204 and the second actuator 300 are substantially parallel to the third axis 222. For example, when actuated, a first arm 302 of the first actuator 204 and a second arm 304 of the second actuator 300 move substantially parallel to the third axis 222, thereby moving the second corner 210 and/or the third corner 212, respectively, toward or away from the satellite 100). The example first actuator 204 and/or the example second actuator 300 may be actuated to rotate the base 202 approximately ten degrees about an axis of rotation (e.g., the first axis 218 and/or the second axis 220). Other examples rotate other amounts (e.g., five degrees, forty five degrees, etc.) and/or about other axes.

In the illustrated example, the first actuator 204 and the second actuator 300 are in communication with a controller 306. The example controller 306 may reside in the satellite 100, within the ground station 104, and/or in any other suitable location. In the illustrated example, the controller 306 controls a first stroke position, $h_1$, of the first actuator 204 and a second stroke position, $h_2$, of the second actuator 300. In other examples, the first actuator 204 and the second actuator 300 are controlled via separate controllers. As described in greater detail below, the controller 306 determines and compensates for a first stroke position error corresponding to the first actuator 204 and a second stroke position error corresponding to the second actuator 300 to point the payload 206 at the ground station 104.

Figure 4:
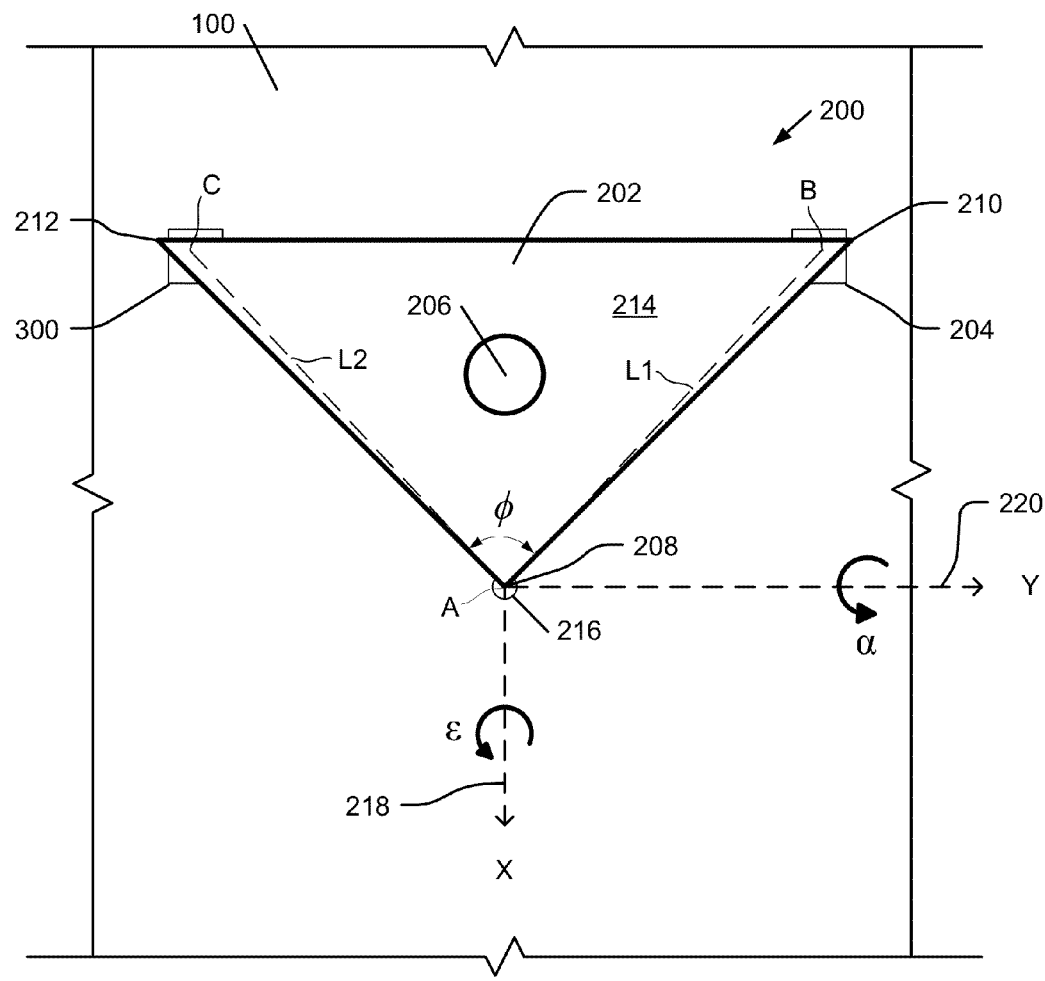
FIG. 4 is a top view of the example payload assembly of FIGS. 2-3.

FIG. 4 is a top view of the example payload assembly 200 of FIGS. 2-3. In the illustrated example, point B (i.e., where the example first actuator 204 is coupled to the base 202) is a first distance L1 from point A. Point C (i.e., where the example second actuator 300 is coupled to the base 202) is a second distance L2 from point A. In the illustrated example, the first distance L1 and the second distance L2 are substantially equal. In other examples, the first distance L1 and the second distance L2 may be different. The example first actuator 204 and the example second actuator 300 are spaced apart from each other such that the first actuator 204 and the second actuator 300 are substantially ninety degrees apart relative to the joint 216 (i.e., a separation angle $\phi$ between the first actuator 204 and the second actuator 300 is substantially ninety degrees). In other examples, the first actuator 204 and/or the second actuator 300 are in other positions relative to the joint 216 (e.g., the separation angle $\phi$ is greater than or less than ninety degrees, etc.).

In the illustrated example, to communicate information from the example satellite 100 to the ground station 104, the example satellite 100 transmits one or more signals to the ground station 104 via the payload 206. To facilitate transmission of the signal, the example payload 206 is pointed at or toward the ground station 104. In other examples, the payload 206 is pointed at a target other than the ground station 104 to, for example, generate images of the target, receive signals from the target, take measurements (e.g., via a sensor), etc. Thus, while the following examples are described in conjunction with the example ground station 104, the base may be oriented to point the payload 206 at any other suitable target in accordance with the teachings of this disclosure. In the illustrated example, the payload 206 is pointed at the ground station 104 by aligning the payload 206 with a line of sight (LOS) vector extending from the ground station 104 to the satellite 100 or from the satellite 100 to the ground station 104 (e.g., such that the signals transmitted via the payload 206 substantially propagate along the LOS vector). To align the payload 206 with the LOS vector, the controller 306 actuates the first actuator 204 and/or the second actuator 300 to adjust an orientation of the base 202 (i.e., the azimuth angle and the elevation angle of the base 202) and, thus, a pointing direction of the payload 206.

In some examples, the controller 306 and/or the ground station 104 determine the LOS vector from the satellite 100 to the ground station 104 and/or from the ground station 104 to the satellite 100. Based on the LOS vector, an estimated base orientation (i.e., an estimated azimuth angle and an estimated elevation angle of the base 202) to point the payload 206 along the LOS vector (e.g., such that a signal transmitted via the payload propagates substantially along the LOS vector to the ground station 104) may be determined. To move (i.e., orient) the base 202 to the estimated base orientation, a first estimated stroke position and a second estimated stroke position of the first actuator 204 and the second actuator 300, respectively, are determined, and the first actuator 204 and the second actuator 300 are actuated to the first estimated stroke position and the second estimated stroke position, respectively.

In some examples, the LOS vector is determined based on a position of the ground station 104 and a position of the satellite 100. The position of the ground station 104 may be determined based on a position vector of the ground station 104 in an inertial frame such as, for example, an Earth-Centered Earth Fixed frame based on an Earth-Centered Inertial Frame. The position of the satellite 100 may be determined in a frame of the satellite 100 via an orbit frame. In some examples, the orbit frame is determined based on an orbit position vector of the satellite 100 in the Earth-Centered Frame. The LOS vector may then be determined based on a difference vector between the position of the ground station 104 and the position of the satellite 100 in the frame of the satellite 100. Based on the LOS vector, the estimated base orientation to point the payload 206 at the ground station 104 may be determined.

In the illustrated example, once the estimated base orientation is determined, the first estimated stroke position of the first actuator 204 and the second estimated stroke position of the second actuator 300 to orient the base 202 at the estimated base orientation are determined. The first estimated stroke position, $h_1$ of the first actuator 204 and the second estimated stroke position, $h_2$, of the second actuator 300 are a function of the estimated azimuth angle, $\alpha$, and the estimated elevation angle, $\epsilon$, of the base 202 as shown in the following equations:

$$\begin{cases} \tan\alpha = \dfrac{(h_1 + h_2)}{2L\cos(\phi/2)} \\ \tan\epsilon = -\dfrac{\sqrt{2}\cos(\phi/2)(h_1 - h_2)}{\sqrt{(1-\cos(\phi))(2L^2 + 2L^2\cos(\phi) + (h_1 + h_2)^2)}} \end{cases} \quad \text{Equations 1 and 2}$$

In Equations 1 and 2, $\phi$ is the separation angle, and L is the first distance L1 (i.e., the distance from point A to B) or the second distance L2 (i.e., the distance from point A to point C). In the illustrated examples disclosed herein, L1=L2. In other examples, when L1 is not equal to L2, calculations and/or equations described herein account for other variables. As a result, for example, Equations 1 and 2 become more complex when L1 is not equal to L2. However, the calculations and/or equations disclosed herein may be configured or obtained when L1 is not equal to L2. Equations 1 and 2 may be used for each of the first and second actuators to determine the estimated azimuth angle, $\alpha$, and the estimated elevation angle, $\epsilon$, of the base 202. In the illustrated example, because the separation angle $\phi$ is substantially ninety degrees, Equation 1 and Equation 2 simplify as shown in Equations 3 and 4 below:

$$\phi = 90° \rightarrow \begin{cases} \tan\alpha = \dfrac{\sqrt{2}(h_1 + h_2)}{2L} \\ \tan\epsilon = -\dfrac{(h_1 - h_2)}{\sqrt{2L^2 + (h_1 + h_2)^2}} \end{cases} \quad \text{Equations 3 and 4}$$

Based on Equations 3 and 4, the first estimated stroke position, $h_1$, and the second estimated stroke position, $h_2$, may be determined using the following equations:

$$\begin{cases} (h_1 + h_2) = \dfrac{2L\tan\alpha}{\sqrt{2}} \\ (h_1 - h_2) = -\tan\epsilon\sqrt{2L^2 + \left(\dfrac{2L\tan\alpha}{\sqrt{2}}\right)^2} \end{cases} \quad \text{Equations 5 and 6}$$

and $$\begin{cases} h_1 = \dfrac{1}{2}\left(\dfrac{2L\tan\alpha}{\sqrt{2}} - \tan\epsilon\sqrt{2L^2 + \left(\dfrac{2L\tan\alpha}{\sqrt{2}}\right)^2}\right) = \dfrac{L}{\sqrt{2}}\left(\tan\alpha - \dfrac{\tan\epsilon}{\cos\alpha}\right) \\ h_2 = \dfrac{1}{2}\left(\dfrac{2L\tan\alpha}{\sqrt{2}} + \tan\epsilon\sqrt{2L^2 + \left(\dfrac{2L\tan\alpha}{\sqrt{2}}\right)^2}\right) = \dfrac{L}{\sqrt{2}}\left(\tan\alpha + \dfrac{\tan\epsilon}{\cos\alpha}\right) \end{cases} \quad \text{Equations 7 and 8}$$

Equations 7 and 8, for example, provide the actuators' travel computation.

In some examples in which the separation angle $\phi$ is not ninety degrees, the first estimated stroke position and the second estimated stroke position may be determined using Equations 9-12 below:

$$\begin{cases} (h_1 + h_2) = 2L\cos(\phi/2)\tan(\alpha) \\ (h_1 - h_2) = -\dfrac{\tan(\epsilon)\sqrt{(1-\cos(\phi))(2L^2 + 2L^2\cos(\phi) + (2L\cos(\phi/2)\tan(\alpha))^2)}}{\sqrt{2}\cos(\phi/2)} = -\dfrac{L\tan(\epsilon)\sin(\phi)}{\cos(\phi/2)\cos(\alpha)} \end{cases}$$

$$\begin{cases} h_1 = \dfrac{1}{2}L\left(2\cos(\phi/2)\tan(\alpha) - \dfrac{\tan(\epsilon)\sin(\phi)}{\cos(\phi/2)\cos(\alpha)}\right) = L\left(\cos(\phi/2)\tan(\alpha) - \dfrac{\tan(\epsilon)\sin(\phi/2)}{\cos(\alpha)}\right) \\ h_2 = \dfrac{1}{2}L\left(2\cos(\phi/2)\tan(\alpha) + \dfrac{\tan(\epsilon)\sin(\phi)}{\cos(\phi/2)\cos(\alpha)}\right) = L\left(\cos(\phi/2)\tan(\alpha) + \dfrac{\tan(\epsilon)\sin(\phi/2)}{\cos(\alpha)}\right) \end{cases}$$

Using the first estimated stroke position and the second estimated stroke position, the controller 306 communicates a command to the first actuator 204 and the second actuator 300 to actuate to the first estimated stroke position and the second estimated stroke position, respectively. In some examples, the payload 206 may not point at the ground station 104 when the first actuator 204 and the second actuator 300 actuate to the first estimate stroke position and the second estimated stroke position, respectively. Instead, the base 202 may be oriented at a resultant base orientation different than the base orientation at which the payload 206 points at the ground station 104. A difference between the resultant base orientation and the base orientation at which the payload 206 points to the ground station 104 is a base orientation or pointing error. If not compensated for, the base orientation error may affect communication between the satellite 100 and the ground station 104.

In the illustrated example, the base orientation error, $$\begin{bmatrix} d\alpha \\ d\varepsilon \end{bmatrix},$$

is a function of a first stroke position error, $dh_1$, corresponding to the first actuator 204 and a second stroke position error, $dh_2$, corresponding to the second actuator 300 as shown in the following equation:

$$\begin{bmatrix} d\alpha \\ d\varepsilon \end{bmatrix} = M \begin{bmatrix} dh_1 \\ dh_2 \end{bmatrix} = \begin{bmatrix} m_{11} & m_{12} \\ m_{21} & m_{22} \end{bmatrix} \begin{bmatrix} dh_1 \\ dh_2 \end{bmatrix}; \quad \text{Equation 13}$$

where $$m_{11} = m_{12} = \frac{\sqrt{2} L}{(h_1 + h_2)^2 + 2L^2}$$

$$m_{21} = -m_{22} = -\frac{L^3(L^2 + h_2^2 + h_1 h_2)(2L^2 + (h_1 + h_2)^2)}{(L^2 + h_1^2 + h_2^2)(L^2(h_1 + h_2)^2 + 2L^4)^{3/2}}.$$

In some examples, the base orientation error is determined experimentally by, for example, communicating signals from the satellite 100 to the ground station 104 and/or by communicating signals from the ground station 104 to the satellite 100.

Figure 5:
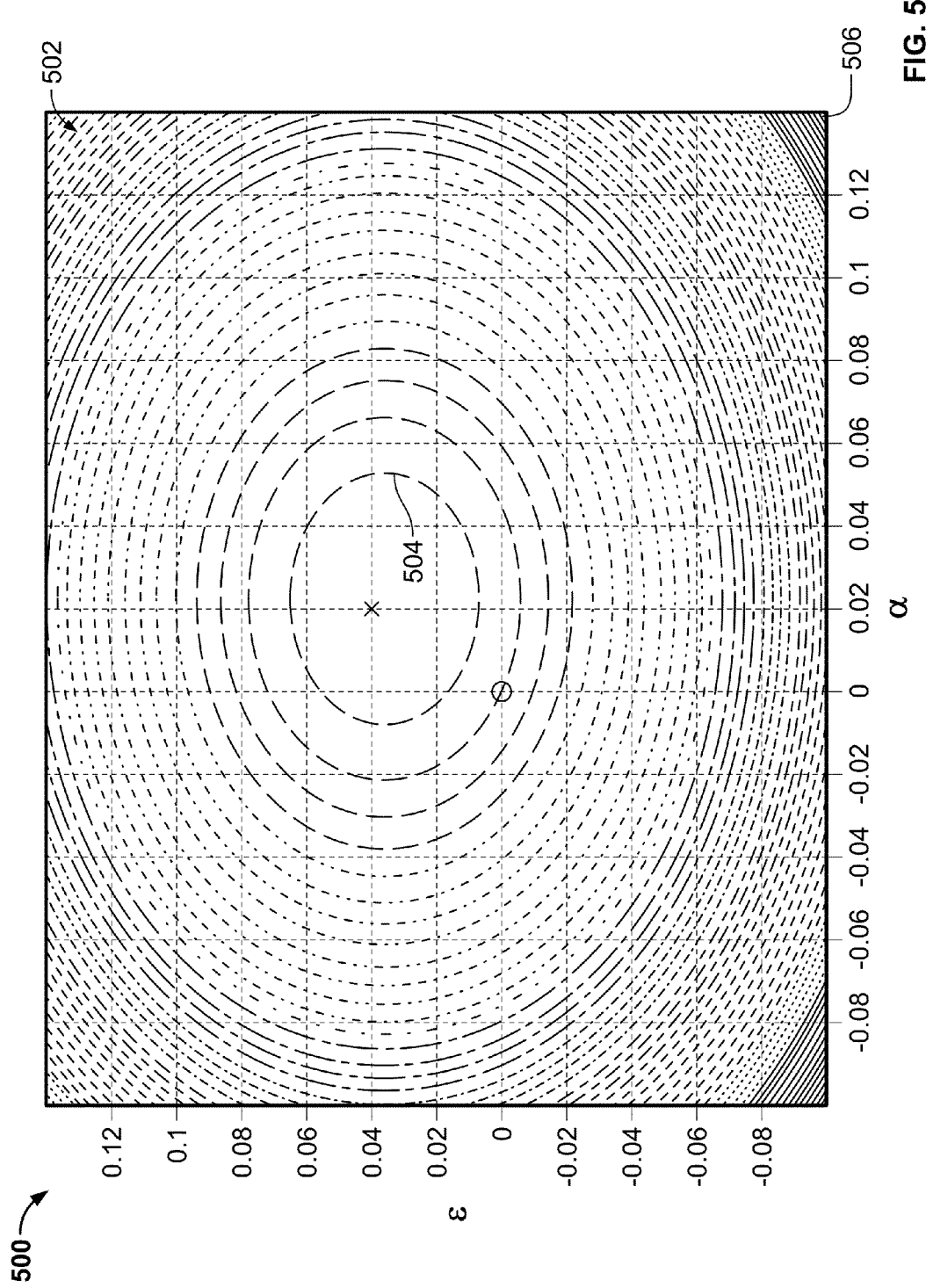
FIG. 5 is a two-dimensional plot of payload signal power levels detected at the example target of FIG. 1.
Figure 6:
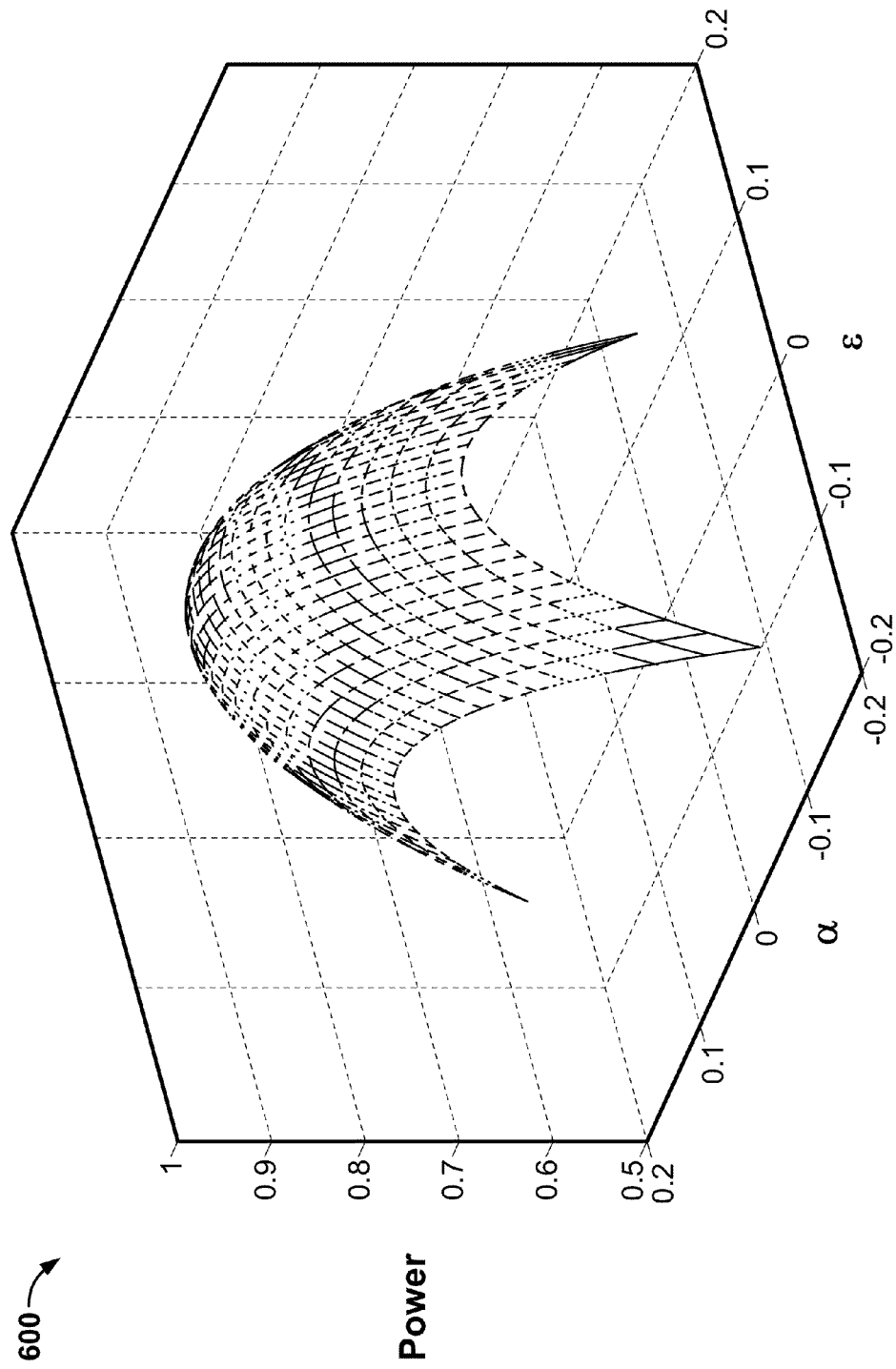
FIG. 6 is a three-dimensional plot of the payload signal power levels detected at the example target of FIG. 1.

FIGS. 5-6 are plots 500 and 600 illustrating power levels of a payload signal detected at the ground station 104. FIG. 5 is a two-dimensional plot 500 of the power levels detected at the ground station 104, and FIG. 6 is a three-dimensional plot 600 of the power levels detected at the ground station 104. In the illustrated example, the base orientation error is determined based on the power levels of the payload signal detected at the ground station 104 while the payload 206 is moved to scan (e.g., raster scan) a given area. When the example payload 206 is pointed at the ground station 104, the ground station 104 detects a maximum power level. As the payload 206 points away from the ground station 104, the ground station 104 detects a lesser power level. In the illustrated example, a first axis of each of the plots 500 and 600 corresponds to the azimuth angle of the base 202, and a second axis of each of the plots 500 and 600 corresponds to the elevation of the base 202. In the example plot 500 of FIG. 5, the power levels are illustrated by rings 502 having sizes corresponding to an amount of power detected at the ground station 104. In the example plot of FIG. 5, a smallest ring 504 corresponds to a maximum power level detected at the ground station 104, and a largest ring 506 corresponds to a lowest power level detected at the ground station 104. In the example plot 600 of FIG. 6, a third axis corresponds to the power levels detected at the ground station 104.

In the example plots 500 and 600 of FIGS. 5 and 6, coordinates (0, 0) and (0, 0, 0), respectively, correspond to the resultant base orientation (i.e., an orientation of the base 202 when the first actuator 204 and the second actuator 300 are actuated based on the first estimated stroke position and the second estimated stroke position, respectively). When the base 202 is oriented at the resultant base orientation, the ground station 104 detects the power levels of the signal communicated by the payload 206. Then, the payload 206 is scanned (e.g., raster scanned) or moved to point to some or all positions illustrated in the plots 500 and 600 of FIGS. 5-6 while the power levels are detected (e.g., continuously, at predetermined intervals of time, etc.) at the ground station 104. In the illustrated example, the ground station 104 detects the maximum power level when the base 202 is positioned at coordinates (0.02, 0.04). Thus, the payload 206 substantially points at the ground station 104 when the base 202 is positioned at coordinates (0.02, 0.04). The base orientation error is a distance between the orientation of the base 202 at which the ground station 104 measures the maximum amount of power (e.g., coordinates (0.02, 0.04)) and the resultant base orientation (e.g., (0, 0)) as shown in the following equation:

$$\begin{bmatrix} d\alpha \\ d\varepsilon \end{bmatrix}_{measure} = \begin{bmatrix} \alpha \\ \varepsilon \end{bmatrix}_{measure} - \begin{bmatrix} \alpha \\ \varepsilon \end{bmatrix}_{cmd} \quad \text{Equation 14}$$

where the first term on the right labeled with subscript "measure" represents measured values of the base angles, the second term on the right labeled with subscript "cmd" represents the commanded values (e.g., estimated values) of the base angle, and the term on the left is the difference between the commanded based angles and the measured base angles, or the base orientation error.

In some examples, signals (e.g., radio frequency (RF) signals, etc.) are communicated from the ground station 104 (e.g., via ground-based beacon systems) to the satellite 100 to determine the base orientation error. When the satellite 100 receives the signals, the satellite 100 decodes and/or demodulates the signals to determine the base orientation error. Other examples employ other techniques to determine the base orientation error.

Based on the base orientation error and using, for example, the following equation, a first stroke position error of the first actuator 204 and a second stroke position error of the second actuator 300 may be determined:

$$\begin{bmatrix} dh_1 \\ dh_2 \end{bmatrix}_{est} = \begin{bmatrix} m_{11} & m_{12} \\ m_{21} & m_{22} \end{bmatrix}^{-1} \begin{bmatrix} d\alpha \\ d\varepsilon \end{bmatrix}_{measure}; \quad \text{Equation 15}$$

where the term on the left represents estimated first and second stroke position errors and where $$m_{11} = m_{12} = \frac{\sqrt{2} L}{(h_1 + h_2)^2 + 2L^2}$$

$$m_{21} = -m_{22} = -\frac{L^3(L^2 + h_2^2 + h_1 h_2)(2L^2 + (h_1 + h_2)^2)}{(L^2 + h_1^2 + h_2^2)(L^2(h_1 + h_2)^2 + 2L^4)^{3/2}}$$

when assuming L1 equals L2.

In the illustrated example, the first and second stroke position errors, $dh_1$ and $dh_2$, respectively, are inherent in the payload assembly 200 (i.e., the stroke position errors are constant or invariable relative to the orientation of the base 202 and/or an amount of rotation of the base 202 via the first actuator 204 and/or the second actuator 300). Thus, the controller 306 may compensate for the first and second stroke position errors to point the payload 206 at the target irrespective of a range of movement of the base 202. In the illustrated example, the controller 306 compensates for the first and second stroke position errors by commanding the first actuator 204 and the second actuator 300 to actuate to the first and second corrected stroke positions. To determine the first and second corrected stroke positions, the first and second stroke position errors are subtracted from the first and second estimated stroke positions, respectively, as shown in the following equation:

$$\begin{bmatrix} h_1 \\ h_2 \end{bmatrix} = \underbrace{\begin{bmatrix} h_1 \\ h_2 \end{bmatrix}_{nonlinear}}_{\substack{\text{Nominally calculated actuator} \\ \text{travel based on the desired or} \\ \text{commanded base angles}}} - \begin{bmatrix} dh_1 \\ dh_2 \end{bmatrix}_{est} \quad \text{Equation 16}$$

where the first term on the right labeled with subscript "nonlinear" is the nominally calculated actuator travel based on the desired (or commanded or estimated) base angles and the second term on the right with subscript "est" estimate the actuator errors.

When the first actuator 204 is actuated to the first corrected stroke position and the second actuator 300 is actuated to the second corrected stroke position, the base 202 is oriented such that the payload 206 points at the ground station 104.

The pointing direction of the payload 206 may be subsequently adjusted to keep the payload 206 pointed at the ground station 104 (e.g., if the satellite 100 moves relative to the ground station 104), point the payload 206 at another target, etc. In such examples, the controller 306 determines an updated estimated base orientation to point the payload 206 at the ground station 104 (or other target) based on an updated LOS vector from the satellite 100 to the ground station 104 (or the other target) and/or from the ground station 104 to the satellite 100. The controller 306 then determines a first updated estimated stroke position and a second updated estimated stroke position based on the updated estimated base orientation. To compensate for the first and second stroke position errors, the controller 306 determines first and second updated corrected stroke positions. To determine the first and second updated corrected stroke positions, the controller 306 subtracts the first and second stroke position errors from the first and second updated estimated stroke positions, respectively. The controller 306 communicates a command to the first actuator 204 and the second actuator 300 to move to the first and second updated corrected stroke positions, and the first actuator 204 and the second actuator 300 actuate to point the payload 206 at the ground station 104 (or the other target).

In some examples, alignment errors such as, for example, actuator alignment errors, actuator assembly parameter errors influenced by, for example, thermal expansion, machining tolerances, etc. influence the first stroke position error and/or the second stroke position error. In some such examples, the example controller 306 may compensate for the alignment errors. The example alignment errors determined below are related to the separation angle φ and the first distance L1 from point A to point B and/or the second distance L2 from point A to point C. However, additionally or alternatively, other alignment errors may be determined in other examples. The example alignment errors may be determined using, for example, the following equation:

$$\begin{bmatrix} d\alpha \\ d\varepsilon \end{bmatrix} = [M\ G] \begin{bmatrix} dh_1 \\ dh_2 \\ d\phi \\ dL \end{bmatrix} = \underbrace{\begin{bmatrix} m_{11} & m_{12} & g_{11} & g_{12} \\ m_{21} & m_{22} & g_{21} & g_{22} \end{bmatrix}}_{C} \begin{bmatrix} dh_1 \\ dh_2 \\ d\phi \\ dL \end{bmatrix} = C, \quad \text{Equation 17}$$

where $$m_{11} = m_{12} = \frac{\sqrt{2}\,L}{(h_1 + h_2)^2 + 2L^2}$$

$$m_{21} = -m_{22} = -\frac{L^3(L^2 + h_2^2 + h_1 h_2)(2L^2 + (h_1 + h_2)^2)}{(L^2 + h_1^2 + h_2^2)(L^2(h_1 + h_2)^2 + 2L^4)^{3/2}}$$

$$g_{11} = \frac{\sin\left(\frac{\alpha}{2}\right) \times (h_1 + h_2)}{4L \times \cos^2\left(\frac{\alpha}{2}\right) \times \left(\frac{(h_1 + h_2)^2}{4L^2 \times \cos^2\left(\frac{\alpha}{2}\right)} + 1\right)}$$

$$g_{12} = -\frac{(h_1 + h_2)}{2L^2 \times \cos^2\left(\frac{\alpha}{2}\right) \times \left(\frac{(h_1 + h_2)^2}{4L^2 \times \cos^2\left(\frac{\alpha}{2}\right)} + 1\right)}$$

$$g_{21} = -\frac{\dfrac{\sqrt{2}\,L\cos\left(\frac{\alpha}{2}\right)(h_1 - h_2)}{2\left[L^4 - L^4\cos(2\alpha) - 2L^2(h_1 + h_2)^2\left(\frac{\cos(\alpha)}{2} - \frac{1}{2}\right)\right]^{1/2}} + \dfrac{\sqrt{2}\,L\cos\left(\frac{\alpha}{2}\right)(h_1 - h_2)[2L^2\sin(2\alpha) + L^2\sin(\alpha)(h_1 + h_2)^2]}{2\left[L^4 - L^4\cos(2\alpha) - 2L^2(h_1 + h_2)^2\left(\frac{\cos(\alpha)}{2} - \frac{1}{2}\right)\right]^{3/2}}}{\dfrac{2L^2\cos^2\left(\frac{\alpha}{2}\right)(h_1 - h_2)^2}{L^4\cos(2\alpha) - L^4 + 2L^2(h_1 + h_2)^2\left(\frac{\cos(\alpha)}{2} - \frac{1}{2}\right)} - 1}$$

$$g_{22} = -\frac{\dfrac{\sqrt{2}\,L\cos\left(\dfrac{\alpha}{2}\right)(h_1-h_2)}{\left[L^4 - L^4\cos(2\alpha) - 2L^2(h_1+h_2)^2\left(\dfrac{\cos(\alpha)}{2}-\dfrac{1}{2}\right)\right]^{1/2}} + \dfrac{\sqrt{2}\,L\cos\left(\dfrac{\alpha}{2}\right)(h_1-h_2)\left[4L^3\cos(2\alpha)-4L^3+4L(h_1+h_2)^2\left(\dfrac{\cos(\alpha)}{2}-\dfrac{1}{2}\right)\right]}{2\left[L^4 - L^4\cos(2\alpha) - 2L^2(h_1+h_2)^2\left(\dfrac{\cos(\alpha)}{2}-\dfrac{1}{2}\right)\right]^{3/2}}}{\dfrac{2L^2\cos^2\left(\dfrac{\alpha}{2}\right)(h_1-h_2)^2}{L^4\cos(2\alpha) - L^4 + 2L^2(h_1+h_2)^2\left(\dfrac{\cos(\alpha)}{2}-\dfrac{1}{2}\right)} - 1}$$

In Equation 17, L is the first distance L1 or the second distance L2 when L1=L2. In some examples, when L1 is not equal to L2, equation 17 becomes more complex and is not further described herein for simplicity. Thus, in some examples, a variation of Equation 17 may be used when L1 is not equal to L2. Using, for example, Equation 18 below, a sequential estimator may be used to estimate the alignment errors in Equation 17:

$$\begin{bmatrix} dh_1 \\ dh_2 \\ d\phi \\ dL \end{bmatrix}_{est,k} = \bar{x}_k = \bar{x}_{k-1} + K_k\left(\begin{bmatrix} d\alpha \\ d\varepsilon \end{bmatrix}_{measure,k} - C\bar{x}_{k-1}\right) \quad \text{Equation 18}$$

where the subscript "est" represent the estimated or commanded values and the subscript "measure" represent the measured values.

In other examples, other estimators are used. In Equation 18, $K_k$ is an update gain matrix at a k-th step. The gain matrix may be designed using any suitable method(s) such as minimum-variance, Kalman filter, fixed gain observers, etc. Thus, in the illustrated example, an amount of thermal distortion along the first distance (or any other suitable portion of the base 202) may be determined. Based on the alignment errors determined using Equations 17 and 18, corrected actuator assembly parameter values (e.g., the separation angle φ, the first distance L1, etc.) may be determined as follows:

$$\begin{cases} \phi_{est} = \phi + d\phi_{est} \\ L_{est} = L + dL_{est} \end{cases} \quad \text{Equation 19}$$

where values with subscript "est" represent estimated values. Because the alignment errors affect a determination of the estimated stroke positions, corrected estimated stroke positions may be determined based on the corrected actuator assembly parameters values as show in Equation 20 below:

$$\begin{bmatrix} h_1 \\ h_2 \end{bmatrix}_{cmd\_nom} = \begin{bmatrix} h_1(\alpha, \varepsilon, \phi_{est}, L_{est}) \\ h_2(\alpha, \varepsilon, \phi_{est}, L_{est}) \end{bmatrix}_{nonlinear} \quad \text{Equation 20}$$

Calculated actuator steps from nonlinear relation of required based angles and the estimated actuator geometry parameters Based on the corrected estimated stroke positions and the stroke position errors, the corrected stroke positions may be determined using the following equation:

$$\begin{bmatrix} h_1 \\ h_2 \end{bmatrix}_{cmd} = \begin{bmatrix} h_1(\alpha, \varepsilon, \phi_{est}, L_{est}) \\ h_2(\alpha, \varepsilon, \phi_{est}, L_{est}) \end{bmatrix}_{nonlinear} - \begin{bmatrix} dh_1 \\ dh_2 \end{bmatrix}_{est} \quad \text{Equation 21}$$

Thus, once the corrected stroke positions are determined, the controller 306 may communicate with the first actuator 204 and the second actuator 300 to actuate to the corrected stroke positions to point the payload 206 at the ground station 104. In such examples, the corrected stroke positions compensate for the stroke position errors and the alignment errors.

Figure 7:
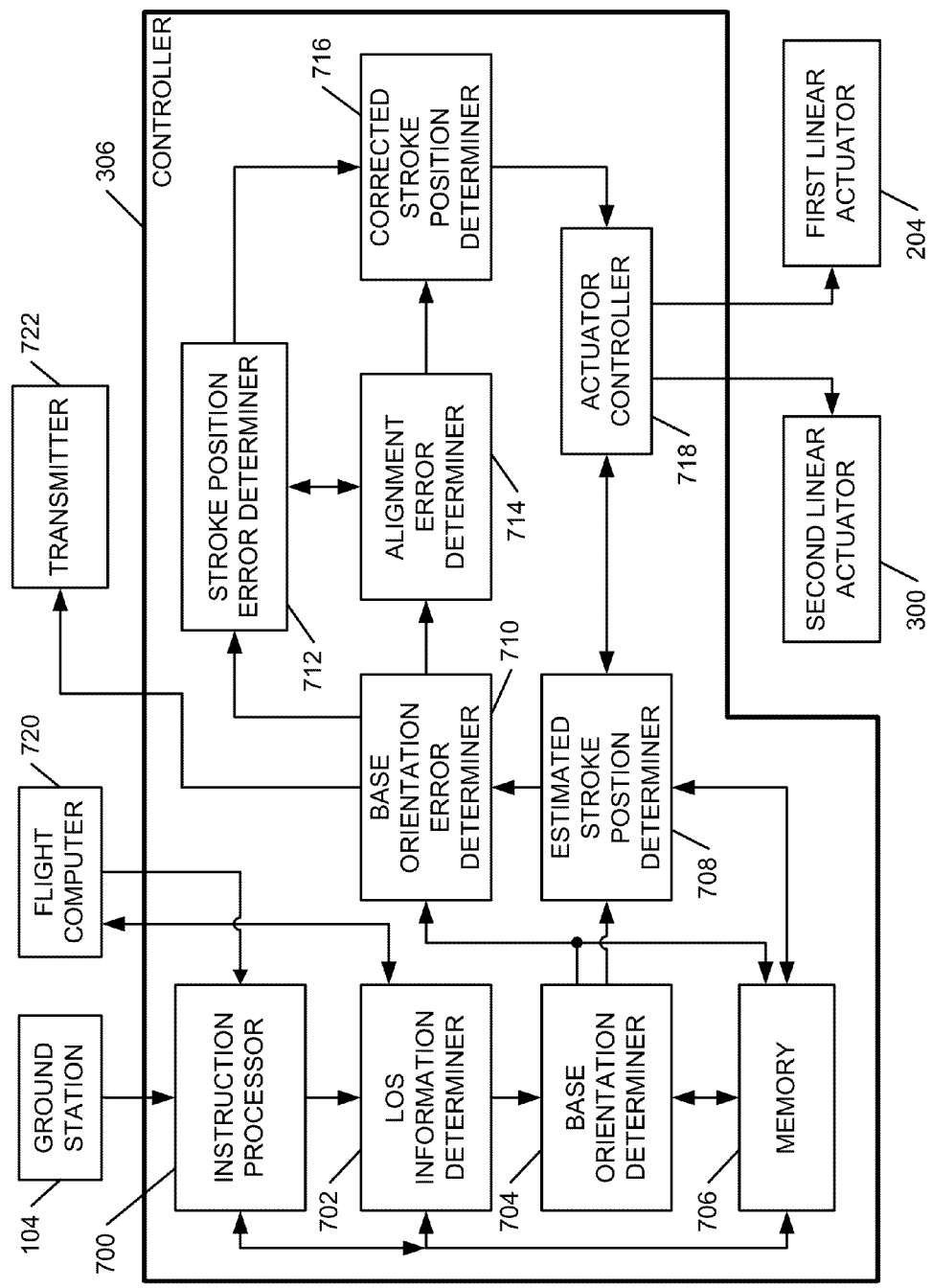
FIG. 7 is a block diagram of an example controller in accordance with the teachings of this disclosure.

FIG. 7 is a block diagram of the example controller 306 of FIG. 3. In the illustrated example, the controller 306 includes an instruction processor 700, a LOS information determiner 702, a base orientation determiner 704, a memory 706, an estimated stroke position determiner 708, a base orientation error determiner 710, a stroke position error determiner 712, an alignment error determiner 714, a corrected stroke position determiner 716, and an actuator controller 718.

The example instruction processor 700 of FIG. 7 receives instructions from the ground station 104 and/or a flight computer 720 disposed on and/or in communication with the satellite 100. In some examples, the instructions include a command to determine a, LOS vector to a target, adjust a pointing direction of the payload 206, actuate the first actuator 204 and/or the second actuator 300, transmit a signal to the ground station 104 via the payload 206, decode and/or demodulate signals received via the satellite 100, etc. These instructions may be executed via the example controller 306, stored in the memory 706, communicated to one or more components of the satellite 100 and/or the ground station 104, etc.

The example LOS determiner of FIG. 7 determines the LOS vector between the satellite 100 and a target (e.g., the ground station 104). In some examples, the LOS vector is based on the position of the satellite 100 and the position of the target in one or more frames of reference. The LOS information determiner 702 may access and/or utilize position information related to the satellite 100 and/or the target from the memory 706 and/or the flight computer 720. In some examples, in response to the flight computer 720 indicating relative movement between the satellite 100 and the ground station 104, instructions to point the payload 206 at a different target, etc., the LOS information determiner 702 determines an updated LOS vector from the satellite 100 to the target and/or from the target to the satellite 100. In some examples, some or all of the LOS information is determined and/or provided via the flight computer and/or the target.

The example base orientation determiner 704 of FIG. 7 determines the estimated base orientation to point the payload 206 at the target (e.g., orient the payload 206 to enable signals transmitted and/or received via the payload 206 to propagate substantially along the LOS vector to the target). In the illustrated example, the base orientation determiner 704 determines an estimated azimuth angle and an estimated elevation angle of the base 202 to point the payload 206 at the target.

The estimated stroke position determiner 708 determines a first estimated stroke position and a second estimated stroke position of the first actuator 204 and the second actuator 300, respectively, to orient the base 202 at the estimated base orientation. In some examples, the estimated stroke position determiner 708 determines the estimated stroke positions based on the estimated base orientation by, for example, using Equations 1-8 and/or Equations 9-12 above. If the example alignment error determiner 714 determines that one or alignment errors are present, the estimated stroke position determiner 708 determines corrected estimated stroke positions to compensate for the alignment errors.

The example base orientation error determiner 710 of FIG. 7 determines the base orientation error. In some examples, the base orientation error determiner 710 determines the base orientation error experimentally. For example, the base orientation error determiner 710 may instruct a transmitter 722 (e.g., an antenna transmitter) to transmit a signal when the first actuator 204 is in the first estimated stroke position and the second actuator 300 is in the second estimated stroke position. At the ground station 104, a power level of the signal is detected, and the base orientation error determiner 710 may instruct the actuator controller 718 to move (e.g., span) the payload 206. At the ground station 104, power levels of the signal are detected while the payload 206 is moved. Based on the power levels detected at the ground station 104, the base orientation error is determined by the base orientation error determiner 710. In some examples, the base orientation error is determined via the ground station 104 and communicated to satellite 100. In other examples, signals (e.g., radio frequency (RF) signals, etc.) are communicated from the ground station 104 (e.g., via ground-based beacon systems) to the satellite 100, and the base orientation error determiner 710 determines the base orientation error by decoding and/or demodulating the signals.

The example stroke position error determiner 712 of FIG. 7 determines a first stroke position error of the first actuator 204 and a second stroke position error of the second actuator 300. In the illustrated example, the stroke position error determiner 712 determines the first and second stroke position errors based on the base orientation error. In the illustrated example, the stroke position errors are inherent in the payload assembly 200 (i.e., the stroke position errors are constant or invariable relative to the orientation of the base 202 and/or an amount of rotation of the base 202 via the first actuator 204 and/or the second actuator 300). Thus, the controller 306 may compensate for the first and second stroke position errors irrespective of an amount of movement of the base 202 to point the payload 206 at the target.

The example alignment error determiner 714 of FIG. 7 determines alignment errors of the example actuator assembly such as, for example, an alignment error of the first actuator 204 and/or the second actuator 300, actuator assembly parameter value errors influenced by thermal distortion (e.g., thermal expansion, thermal contraction, bending influenced by a temperature gradient, etc.), machining tolerances, etc, and/or other alignment errors, etc. In some examples, the alignment error determiner 714 determines corrected actuator assembly parameter values such as, for example, a corrected separation angle, a corrected distance between point A and point C (i.e., a length between a first point about which the base 202 rotates via the joint 216 and a second point where the second actuator 300 is coupled to the base 202). The corrected actuator assembly parameter values may be used by the estimated stroke position determiner 708 to determine corrected estimated stroke positions.

The example corrected stroke position determiner 716 of FIG. 7 determines a first corrected stroke position of the first actuator 204 and a second corrected stroke position of the second actuator 300 based on the first and second stroke position errors, respectively. In some examples, the first corrected stroke position and the second corrected stroke position compensate for the first and second stroke position errors, respectively, and the alignment errors. When the first actuator 204 and the second actuator 300 are actuated to the first corrected stroke position and the second corrected stroke position, respectively, the payload 206 points at the target.

The actuator controller 718 controls the first actuator 204 and/or the second actuator 300. In the illustrated example, the actuator controller 718 instructs the first actuator 204 to actuate to a given stroke position such as, for example, the first estimated stroke position, the first corrected stroke position, and/or any other stroke position. The example actuator controller 718 may instruct the second actuator 300 to actuate to a given stroke position such as, for example, the second estimated stroke position, the second corrected stroke position, and/or any other stroke position. In some examples, the actuator controller 718 instructs the first actuator 204 and/or the second actuator 300 to move the payload 206 to scan (e.g., raster scan) an area.

The example memory 706 (e.g., volatile memory, non-volatile memory, etc.) stores information such as, for example, a position of the ground station 104, a position of the satellite 100, actuator assembly parameter values, corrected actuator assembly parameter values, estimated stroke positions, stroke position errors, payload alignment errors, and/or any other information. The information stored in the example memory 706 may be accessed by one or more components of the example controller 306, the example satellite 100, the example ground station 104, etc.

While an example manner of implementing the controller 306 of FIG. 3 has been illustrated in FIG. 7, one or more of the elements, processes and/or devices illustrated in FIG. 7 may be combined, divided, re-arranged, omitted, eliminated and/or implemented in any other way. Further, the instruction processor 700, the LOS information determiner 702, the base orientation determiner 704, the memory 706, the estimated stroke position determiner 708, the base orientation error determiner 710, the stroke position error determiner 712, the alignment error determiner 714, the corrected stroke position determiner 716, the actuator controller 718, the ground station 104, the flight computer 720, the transmitter 722, the first actuator 204, the second actuator 300 and/or, more generally, the example controller 306 of FIG. 7 may be implemented by hardware, software, firmware and/or any combination of hardware, software and/or firmware. Thus, for example, any of the instruction processor 700, the LOS information determiner 702, the base orientation determiner 704, the memory 706, the estimated stroke position determiner 708, the base orientation error determiner 710, the stroke position error determiner 712, the alignment error determiner 714, the corrected stroke position determiner 716, the actuator controller 718, the ground station 104, the flight computer 720, the transmitter 722, the first actuator 204, the second actuator 300 and/or, more generally, the example controller 306 of FIG. 7 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the instruction processor 700, the LOS information determiner 702, the base orientation determiner 704, the memory 706, the estimated stroke position determiner 708, the base orientation error determiner 710, the stroke position error determiner 712, the alignment error determiner 714, the corrected stroke position determiner 716, the actuator controller 718, the ground station 104, the flight computer 720, the transmitter 722, the first actuator 204, the second actuator 300 and/or, more generally, the example controller 306 of FIG. 7 are hereby expressly defined to include a tangible computer readable medium such as a memory, DVD, CD, Blu-ray, etc. storing the software and/or firmware. Further still, the example controller 306 of FIG. 7 may include one or more elements, processes and/or devices in addition to, or instead of, those illustrated in FIG. 7, and/or may include more than one of any or all of the illustrated elements, processes and devices.

Figure 8:
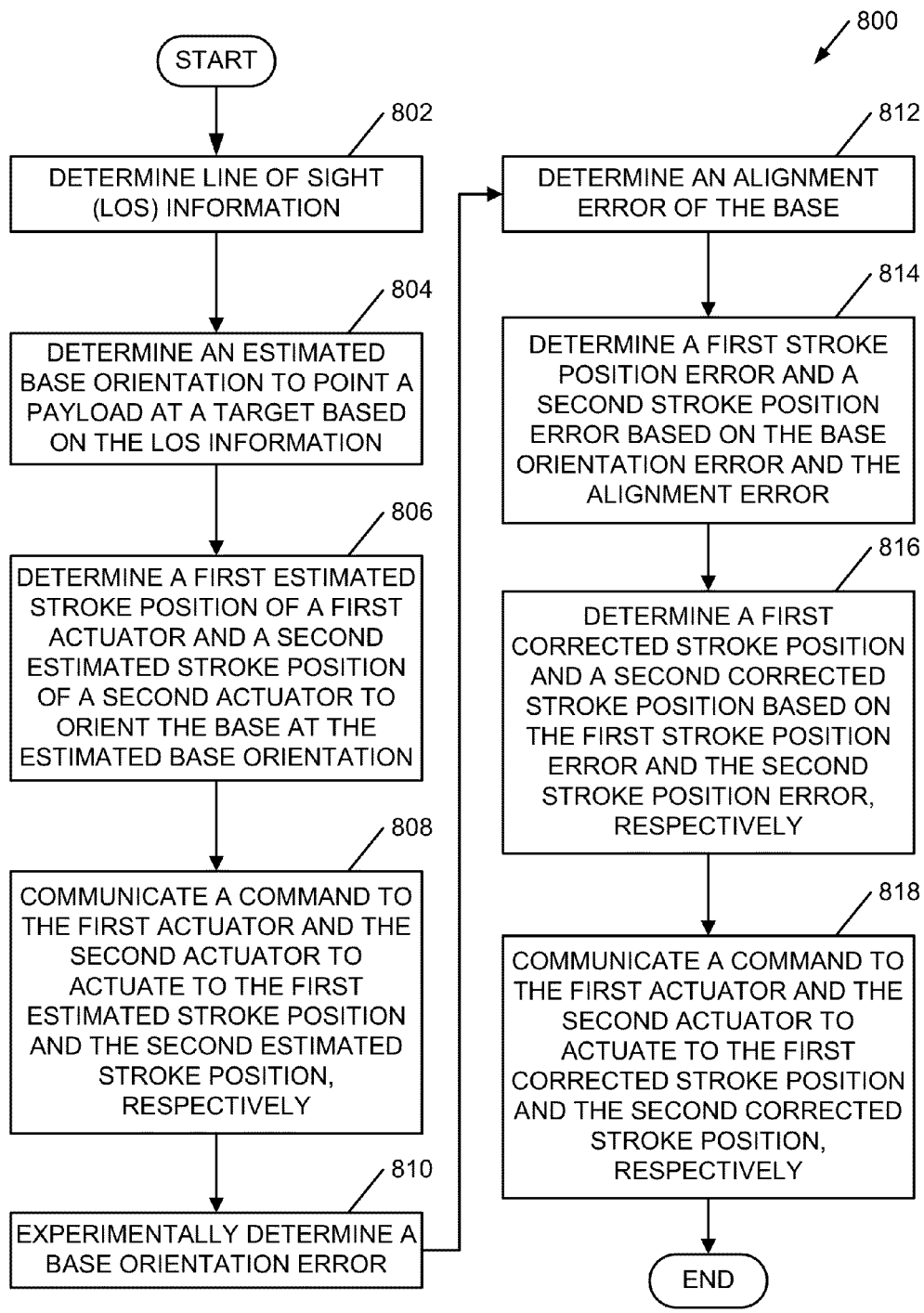
FIG. 8 is a flow diagram of an example process disclosed herein.
Figure 9:
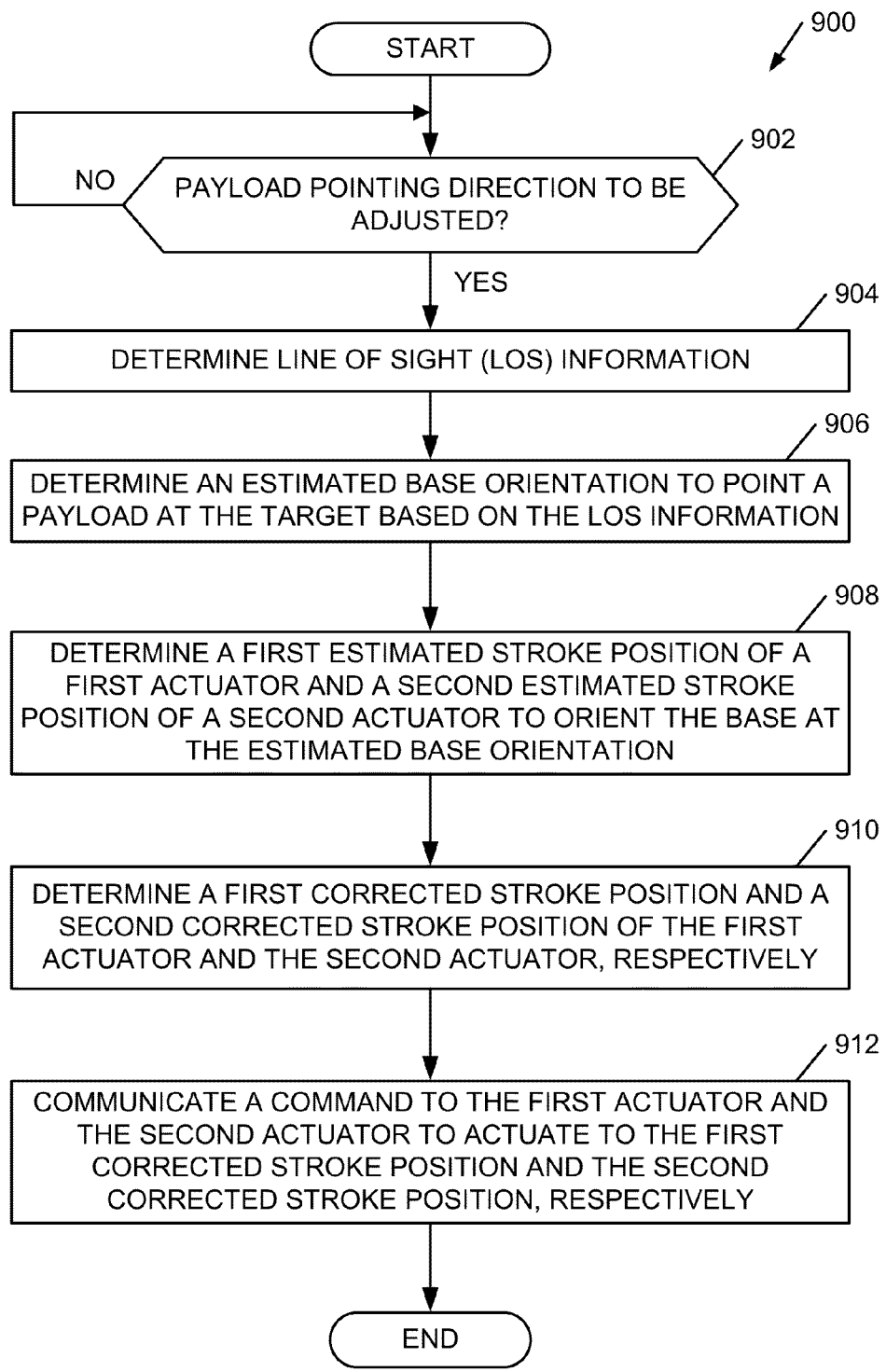
FIG. 9 is a flow diagram of another example process disclosed herein.

FIGS. 8-9 depict example flow diagrams representative of methods or processes that may be implemented using, for example, computer readable instructions. The example processes of FIGS. 8-9 may be performed using a processor, a controller (e.g., the example controller 306 of FIG. 7) and/or any other suitable processing device. For example, the example processes of FIGS. 8-9 may be implemented using coded instructions (e.g., computer readable instructions) stored on a tangible computer readable medium such as a flash memory, a read-only memory (ROM), and/or a random-access memory (RAM). As used herein, the term tangible computer readable medium is expressly defined to include any type of computer readable storage and to exclude propagating signals. Additionally or alternatively, the example process of FIGS. 8-9 may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example processes of FIGS. 8-9 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, one or more operations depicted in FIGS. 8-9 may be implemented manually or as any combination(s) of any of the foregoing techniques, for example, any combination of firmware, software, discrete logic and/or hardware.

Further, although the example processes of FIGS. 8-9 are described with reference to the flow diagrams of FIG. 8-9, respectively, other methods of implementing the processes of FIGS. 8-9 may be employed. For example, the order of execution of the blocks may be changed, and/or some of the blocks described may be changed, eliminated, sub-divided, or combined. Additionally, one or more of the operations depicted in FIGS. 8-9 may be performed sequentially and/or in parallel by, for example, separate processing threads, processors, devices, discrete logic, circuits, etc.

FIG. 8 is a flowchart representative of an example method 800 that can be performed to point the payload 206 at a target such as, for example, the ground station of FIG. 1. The example method 800 of FIG. 8 begins by the LOS information determiner 702 of the controller 306 determining line of sight information (block 802). In some examples, determining the line of sight information includes determining a line of sight vector from the target (e.g., the ground station 104) to the satellite 100 and/or from the satellite 100 to the target. In some examples, the ground station 104 and/or the flight computer 720 determines and/or provides some or all of the LOS information. Based on the line of sight information, the base orientation determiner 704 determines an estimated base orientation to point the payload 206 at the target (e.g., the ground station 104) (block 804). In some examples, the estimated base orientation is defined by an estimated azimuth angle of the base 202 and an estimated elevation angle of the base 202 to point the payload 206 at the target.

At block 806, the estimated stroke position determiner 708 determines a first estimated stroke position of the first actuator 204 and a second estimated stroke position of the second actuator 300 to orient the base 202 at the estimated base orientation. At block 808, the actuator controller 718 communicates a command to the first actuator 204 and the second actuator 300 to actuate to the first estimated stroke position and the second estimated stroke position, respectively. In some examples, as a result of thermal distortion, machining tolerances, etc., the payload 206 does not point at the target when the first actuator 204 and the second actuator 300 actuate to the first estimated stroke position and the second estimated stroke position, respectively. In such examples, the base 202 moves to a resultant base orientation. At block 810, the base orientation error determiner 710 determines a base orientation error. The base orientation error may be a distance from the resultant base orientation to the position at which the payload 206 points at the target. In some examples, the base orientation error is determined by detecting power levels of a payload signal (e.g., transmitted via the transmitter 722) at the target. In other examples, the base orientation error is determined by decoding and/or demodulating signals received via the satellite 100 and/or via any other suitable technique.

At block 812, the alignment error determiner 714 determines an alignment error of the base 202. In some examples, the alignment error includes an error in an alignment of the first actuator 204 and/or the second actuator 300, an error in an actuator assembly parameter value such as, for example, the separation angle ϕ, the first distance L1, the second distance L2, etc. In some examples, the alignment error determiner 714 determines one or more corrected actuator assembly parameter values based on the alignment error. Based on the base orientation error and the alignment error, the stroke position error determiner 712 determines a first stroke position error and a second stroke position error corresponding to the first actuator 204 and the second actuator 300, respectively (block 814). At block 816, the corrected stroke position determiner 716 determines a first corrected stroke position and a second corrected stroke position based on the first stroke position error and the second stroke position error, respectively. In the illustrated example, the first and second corrected stroke positions compensate for the alignment error and the stroke position errors. At block 818, the actuator controller 718 communicates a command to the first actuator 204 and the second actuator 300 to actuate to the first corrected stroke position and the second corrected stroke position, respectively. When the first actuator 204 and the second actuator 300 actuate to the first corrected stroke position and the second corrected stroke position, respectively, the first actuator 204 and the second actuator 300 orient the base 202 such that the payload 206 points at the target.

FIG. 9 is a flowchart representative of an example method 900 that can be performed to point the payload 206 at a target. The example method 900 of FIG. 9 begins by determining if the payload pointing direction is to be adjusted (block 902). In some examples, the flight computer 720 monitors a position of the satellite 100 relative to the target. If the flight computer 720 senses relative movement of the satellite 100, the flight computer 720 communicates instructions to the instruction processor 700 to adjust a pointing direction of the payload 206 to point the payload 206 at the target. In some examples, the controller 306 may be instructed to adjust the pointing direction of the payload 206 to point the payload 206 at a different target. If the payload pointing direction is to be adjusted, the LOS information determiner 702 determines line of sight information (block 904). In some examples, the flight computer 720 and/or the target provides and/or determines some or all of the LOS information. In some examples, the line of sight information includes a line of sight vector from the target to the satellite 100 and/or from the satellite 100 to the target. Based on the light of sight information, the base orientation determiner 704 determines the estimated base orientation to point the payload 206 at the target (block 906). At block 908, the estimated stroke position determiner 708 determines a first estimated stroke position of the first actuator 204 and a second estimated stroke position of the second actuator 300 to orient the base 202 at the estimated base orientation. In some examples, the first estimated stroke position and/or the second estimated stroke position may be determined based on previously determined corrected actuator assembly parameter values such as, for example, a corrected separation angle, etc. The previously determined corrected actuator assembly parameter values accessed via the memory 706.

At block 910, the corrected stroke position determiner 716 determines a first corrected stroke position and a second corrected stroke position of the first actuator 204 and the second actuator 300, respectively. To determine the first corrected stroke position, the example corrected stroke position determiner 716 compensates for a previously determined first stroke position error (e.g., by subtracting the previously determined first stroke position error from the first estimated stroke position). To determine the second corrected stroke position, the example corrected stroke position determiner 716 compensates for a previously determined second stroke position error (e.g., by subtracting the previously determined second stroke position error from the second estimated stroke position).

At block 912, the actuator controller 718 communicates a command to the first actuator 204 and the second actuator 300 to actuate to the first corrected stroke position and the second corrected stroke position, respectively. When the first actuator 204 and the second actuator 300 are actuated to the first corrected stroke position and the second corrected stroke position, respectively, the base 202 is oriented such that the payload 206 points at the target.

Figure 10:
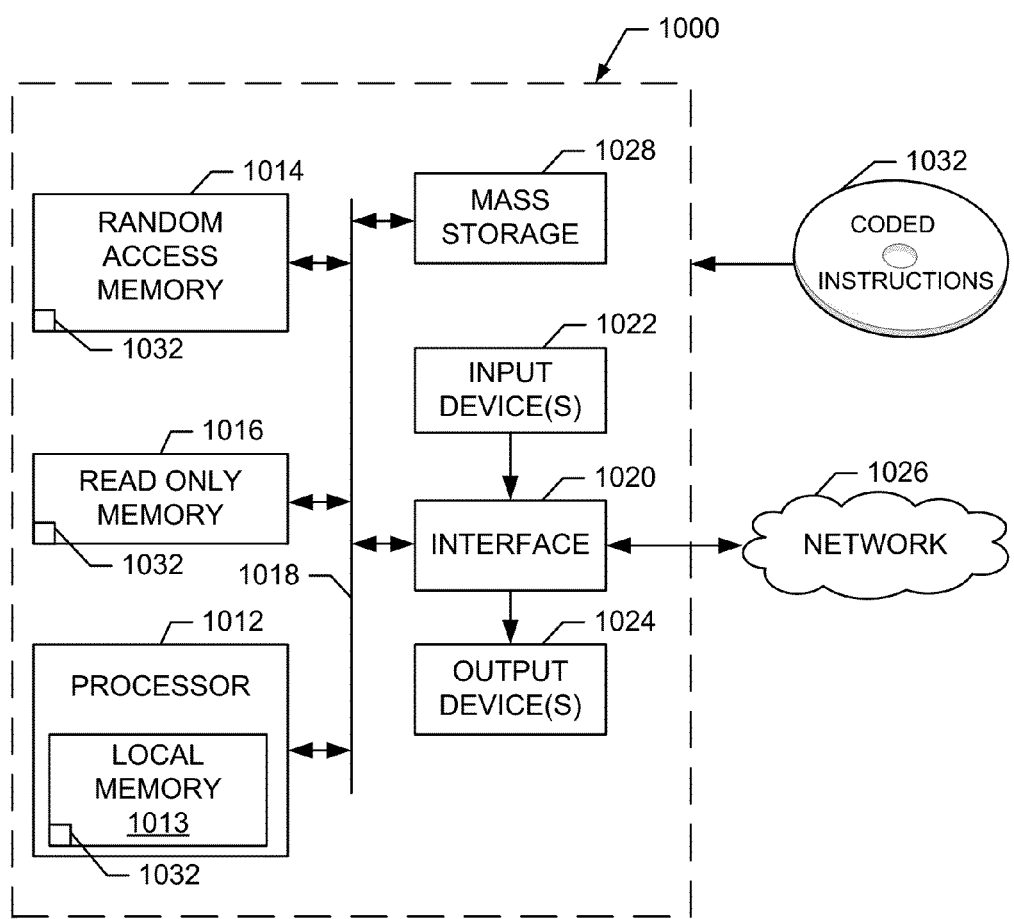
FIG. 10 is a block diagram of an example processing platform capable of executing machine readable instructions to implement the example controller of FIG. 7.

FIG. 10 is a block diagram of an example computer 1000 capable of executing the instructions of FIGS. 8-9 to implement the controller 306 of FIG. 7. The computer 1000 can be any suitable type of computing device.

The computer 1000 of the instant example includes a processor 1012. For example, the processor 1012 can be implemented by one or more microprocessors or controllers from any desired family or manufacturer.

The processor 1012 includes a local memory 1013 (e.g., a cache) and is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The computer 1000 also includes an interface circuit 1020. The interface circuit 1020 may be implemented by any type of interface standard, such as an Ethernet interface, a universal serial bus (USB), and/or a PCI express interface.

One or more input devices 1022 are connected to the interface circuit 1020. The input device(s) 1022 permit a user to enter data and commands into the processor 1012.

One or more output devices 1024 are also connected to the interface circuit 1020. The output devices 1024 can be implemented, for example, by a transmitter (e.g., the transmitter 722). The interface circuit 1020, thus, may include a graphics driver card.

The interface circuit 1020 also includes a communication device (e.g., communication device 56) such as a modem or network interface card to facilitate exchange of data with external computers via a network 1026 (e.g., a bus, coaxial cable, RF signal transmitter, etc.).

The computer 1000 also includes one or more mass storage devices 1028 for storing software and data. Examples of such mass storage devices 1028 include hard drive disks, compact disk drives and digital versatile disk (DVD) drives. The mass storage device 1028 may implement the local storage device 62.

The coded instructions 1032 of FIG. 10 may be stored in the mass storage device 1028, in the volatile memory 1014, in the non-volatile memory 1016, and/or on a removable storage medium such as a CD or DVD.

Although certain example methods, apparatus and articles of manufacture have been described herein, the scope of coverage of this disclosure is not limited thereto. On the contrary, this disclosure covers all methods, apparatus and articles of manufacture fairly falling within the scope of the claims.

The Abstract at the end of this disclosure is provided to comply with 37 C.F.R. §1.72(b) to allow the reader to quickly ascertain the nature of the technical disclosure. It is submitted with the understanding that it will not be used to interpret or limit the scope or meaning of the claims.

What is claimed is:

1. A method of operating a satellite, the method comprising:

operating the satellite having a payload attached to a substantially planar base, the base having a first contact point directly coupled to a pivot joint, a second contact point directly coupled to a first linear actuator and a third contact point directly coupled to a second linear actuator, the first and second linear actuators to move the base via the pivot joint about an azimuth angle and an elevation angle to position the base relative to a target, the base having only the first and second linear actuators to move the base about the pivot joint relative to the azimuth angle and the elevation angle;

estimating a target pointing direction of the base to point the payload at the target;

determining a first estimated stroke position of the first linear actuator and a second estimated stroke position of the second linear actuator to position the base at the target pointing direction;

obtaining a base orientation error;

determining a first stroke position error of the first linear actuator and a second stroke position error of the second linear actuator based on the base orientation error;

determining a first corrected stroke position of the first linear actuator based on a difference between the first stroke position error and the first estimated stroke position;

determining a second corrected stroke position of the second linear actuator based on a difference between the second stroke position error and the second estimated stroke position; and commanding the first linear actuator to move to the first corrected stroke position and the second linear actuator to move to the second corrected stroke position to point the payload at the target along a line of sight vector without verifying the target pointing direction of the base when the first and second linear actuators are positioned to the respective first and second corrected stroke positions and without using a feedback to verify the base being at the target pointing direction when the first and second linear actuators are positioned to the respective first and second corrected stroke positions.

2. The method of claim 1, further comprising determining an alignment error of the base based on the base orientation error.

3. The method of claim 2, wherein determining the alignment error comprises determining a value of a parameter of the base based on at least one of the first stroke position error or the second stroke position error.

4. The method of claim 1, wherein determining the base orientation error comprises retrieving an experimentally determined value representative of the base orientation error from a controller.

5. The method of claim 1, wherein determining the base orientation error comprises:
moving the first linear actuator to the first estimated stroke position and moving the second linear actuator to the second estimated stroke position;
determining a resultant base orientation when the first actuator is positioned at the first estimated stroke position and the second actuator is positioned at the second estimated stroke position;
communicating a first signal between the payload and the target when the base is at the resultant base orientation;
measuring a power level of the first signal;
moving the base to a plurality of test orientations via the first and second actuators;
communicating a test signal between the payload and the target when the base is positioned at each of the test orientations;
detecting a maximum power level of the test signals;
associating a test orientation of the base with the detected maximum power level of the test signal; and
determining the base orientation error as a difference between the test orientation of the base associated with the detected maximum power level of the signal and the resultant base orientation.

6. A method operating a satellite, the method comprising:
operating the satellite having a payload coupled to a substantially planar base, the base being movable relative to a pivot joint about an azimuth angle and an elevation angle via a first linear actuator and a second linear actuator, the pivot joint, the first linear actuator and the second linear actuator being directly coupled to the base;
receiving a first command to move the payload relative to a first target;
estimating a base orientation to point the payload to the first target along a first line of sight vector;

determining a first estimated stroke position of the first linear actuator and a second estimated stroke position of the second linear actuator to position the base to the estimated base orientation;

modifying the first estimated stroke position to a first corrected stroke position based on a base orientation error;

modifying the second estimated stroke position to a second corrected stroke position based on the base orientation error; and commanding the first actuator to actuate to the first corrected stroke position and commanding the second actuator to actuate to the second corrected stroke position without verifying a final position of the payload after the first actuator is actuated to the first corrected stroke position and the second actuator is actuated to the second corrected stroke position.

7. The method of claim 6, wherein determining the first corrected stroke position includes determining a difference between the first estimated stroke position and a first stroke position error of the first linear actuator provided by the base orientation error.

8. The method of claim 7, wherein determining the second corrected stroke position includes determining a difference between the second estimated stroke position and a second stroke position error of the second linear actuator provided by the base orientation error.

9. The method of claim 6, wherein determining the base orientation error comprises:
prior to receiving the first command, receiving a second command to orient the payload to a second target;
determining a third estimated stroke position of the first linear actuator and a fourth estimated stroke position of the second linear actuator to point the payload to the second target along a second line of sight vector;
commanding the first actuator to actuate to the third estimated stroke position and the second actuator to actuate to the fourth estimated stroke position;
determining a resultant base orientation of the base when the first and second actuators are actuated to the third and fourth estimated stroke positions;
measuring a power level of a signal communicated by the payload when the base is at the resultant base orientation;
moving the payload to scanning positions different than the resultant base orientation by actuating the first and second linear actuators;
measuring additional power levels of signals communicated by the payload when the base is positioned at each of the scanning positions;
comparing all the power levels of the signals associated with the scanning positions and the resultant base orientation;
detecting a maximum power level and an orientation of the base associated with the detected maximum power level; and
determining the base orientation error by measuring a difference between the resultant base orientation and the orientation of the base associated with the detected maximum power level.

10. The method of claim 6, further comprising obtaining an updated line of sight vector between the satellite and a known target.

11. The method of claim 10, further comprising:
determining an updated estimated base orientation to point the payload along the updated line of sight vector;

determining a first updated estimated stroke position and a second updated estimated stroke position based on the updated estimated base orientation;

modifying the first updated estimated stroke position to a first updated corrected stroke position based on the base orientation error;

modifying the second updated estimated stroke position to a second updated corrected stroke position based on the base orientation error; and commanding the first actuator and the second actuator to move to the respective first and second updated corrected stroke positions.

12. A method of operating a satellite, the method comprising:

operating a satellite having a payload coupled to and supported by a substantially planar base, the base being movable relative to a pivot about an azimuth angle and an elevation angle via a first linear actuator and a second linear actuator, the pivot, the first linear actuator and the second linear actuator being directly coupled to the base;

receiving a first command to point the payload to a first target along a first line of sight vector;

estimating a target orientation of the base to point the payload at the first target along the first line of sight vector;

determining a first estimated stroke position of the first linear actuator and a second estimated stroke position of the second linear actuator to move the base to the estimated target orientation;

commanding the first linear actuator to move to the first estimated stroke position and commanding the second linear actuator to move to the second estimated stroke position;

determining a resultant base orientation of the base relative to the first target when the first and second actuators are actuated to the respective first and second estimated stroke positions;

calculating a pointing error based on a difference between the resultant base orientation and the target base orientation;

receiving a second command to point the payload to a second target after calculating the pointing error;

determining a second estimated base orientation to point the payload to the second target;

determining a third estimated stroke position of the first linear actuator and a fourth estimated stroke position of the second linear actuator to move the base to the second estimated base orientation;

determining a first stroke position error and a second stroke position error based on the pointing error prior to moving the first linear actuator and the second linear actuator to the respective third and fourth estimated stroke positions;

determining a first corrected stroke position by determining a difference between the third estimated stroke position and the first stroke position error, and determining a second corrected stroke position by determining a difference between the fourth estimated stroke position and the second stroke position error; and moving the first actuator to the first corrected stroke position and moving the second actuator to the second corrected stroke position to move the base to the second estimated base orientation without verifying a final position of the payload after the first actuator is actuated to the first corrected stroke position and the second actuator is actuated to the second corrected stroke position.

13. A method of claim 12, wherein calculating the pointing error includes:

communicating a first signal between the payload and the first target when the base is positioned at the resultant base orientation;

measuring a first power level of the first signal communicated by the payload;

moving the base to a test base orientation via the first and second linear actuators;

communicating a second signal between the payload and the first target when the base is positioned at the test base orientation;

measuring a second power level of the second signal communicated by the payload; and comparing the second power level and the first power level.

* * * * *